United States Patent [19]
Desvignes et al.

[11] 3,793,523
[45] Feb. 19, 1974

[54] DEVICE FOR THE DETECTION OF MOVING OBJECTS
[75] Inventors: Francois Desvignes, Bourg-La-Reine; Marcel-Georges Herbert, Paris, both of France
[73] Assignee: U. S. Philips Corporation, New York, N.Y.
[22] Filed: May 25, 1973
[21] Appl. No.: 363,839

[52] U.S. Cl. ............ 250/209, 250/208, 250/220 M
[51] Int. Cl. ............................................. H01j 39/12
[58] Field of Search ................ 250/220 M, 209, 208

[56] References Cited
UNITED STATES PATENTS
2,813,983   11/1957   Hammar......................... 250/220 M Primary Examiner—James W. Lawrence
Assistant Examiner—T. N. Grigsby
Attorney, Agent, or Firm—Frank R. Trifari; Henry I. Steckler

[57] ABSTRACT

A device is described for the detection of moving objects, comprising an optical imaging system, a radiation-sensitive detection system for converting radiation emerging from the imaging system into electrical signals, and an electronic circuit for processing the signals. By composing the detection system of four separate detection elements which are arranged in line in the direction in which an image of an object travels, a time-differentiated signal can be obtained.

5 Claims, 9 Drawing Figures

DEVICE FOR THE DETECTION OF MOVING OBJECTS

The invention relates to a device for the detection of moving objects, comprising an optical imaging system, a radiation-sensitive detection system for converting the radiation emerging from the imaging system into electrical signals, and an electronic circuit for processing said signals.

It is known that certain difficulties are associated with the detection of optical radiation. For example, the available radiation will often be weak and changeable. This is particularly so in the case of radiation coming from remote objects which cannot be illuminated, so that only the radiation emitted by the object itself or the ambient radiation reflected by the object can be used. In order to increase the reliability of the detection radiation is used of such frequencies that an optimum signal-to-noise ratio is obtained.

Another problem associated with the detection of optical radiation arises when the speed with which the object passes the detection device is variable, for the optimum frequency band depends on this speed. The construction of a detection device destined for various object speeds becomes very intricate and its performance deteriorates. This problem, for example, occurs when horizon sensors are used for measuring the instantaneous attitude of a spacecraft relative to the earth, so as to permit the attitude of said spacecraft, such as an artificial satellite, to be stabilized by for example gyroscopes.

Such a horizon sensor may be an infrared sensor which consists of a lens or a mirror and an infrared detector, such as a bolometer, which is arranged in the focal point thereof. When the narrow beam which is defined by the objective and the image at infinity of the sensor passes the horizon as the satellite revolves, the radiation on the detector consecutively increases and decreases. This enables an electrical time signal to be derived which provides information about the horizon of the earth entering, being within and leaving the field of view of the horizon sensor.

To obtain this time signal the signal supplied by the detector is compared with a reference signal. When using a single detector signal, errors may arise due to variations of the radiation emitted by the earth affecting the detector signal.

In the known devices the detector signal is then electronically differentiated, so that positive and negative pulses are obtained. These pulses are compared with positive and negative threshold values whose levels are functions of the pulse amplitudes. This means that the peak values of the pulses have to be stored electronically. For the differentiation of the detector signal and the storage of the pulse peak-values a time function is required.

The time constant required for differentiation will be the result of a compromise in which allowance is made for the time constant of the bolometer, the rotation speed of the satellite and the noise which is superimposed on the effective signal. The time constant $\tau$ for the storage of the pulse peak-values should be several times greater than the revolution period of the satellite.

In practice, such a sensor can only be used for rotation speed lying in a narrow range about the rotation speed at which the operation of the sensor is optimum.

It is an object of the present invention to provide a device of the type mentioned in the preamble which does not have said drawbacks. The device according to the invention is characterized in that the detection system comprises four separate radiation-sensitive detection elements which are arranged in line in the direction in which an image of an object travels, the output terminals of the detection elements being interconnected in such a way that the signal at the two output terminals of the complete detection system is the time derivative of the signal which would be produced if a single detector were used.

An advantage of the device according to the present invention is that its operation is time-independent, thus enabling an adaptation to different rotation speeds of the satellite. Furthermore, the device according to the invention is of simple design. The detector elements can be manufactured in accordance with integrated circuit technology.

The invention will now be described, by way of example, with reference to the drawing, in which.

Figure 2:
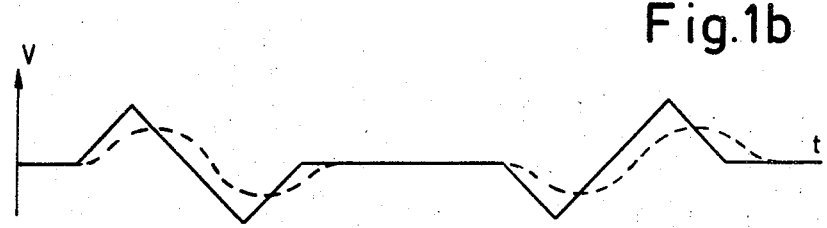
Figure 3:
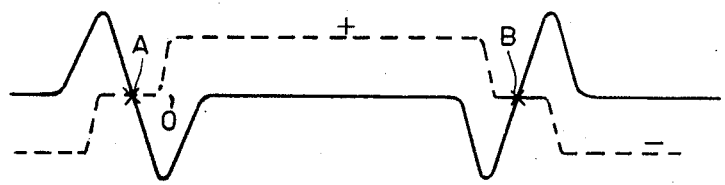
Figure 4:
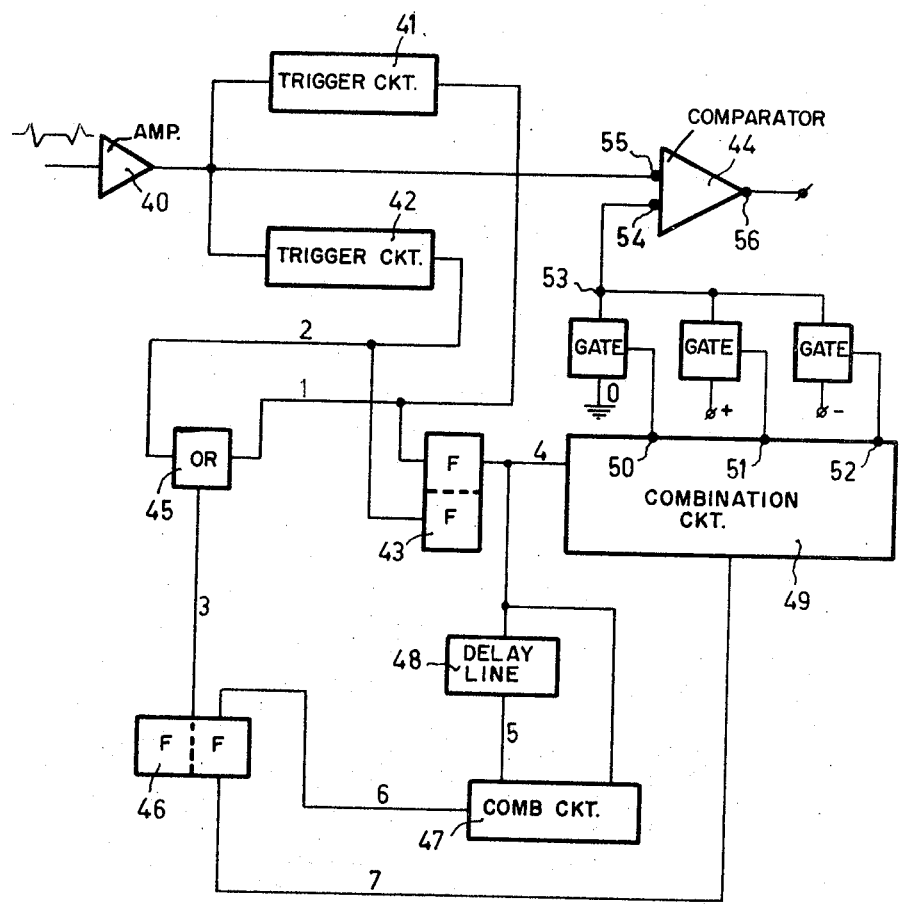
Figure 5:
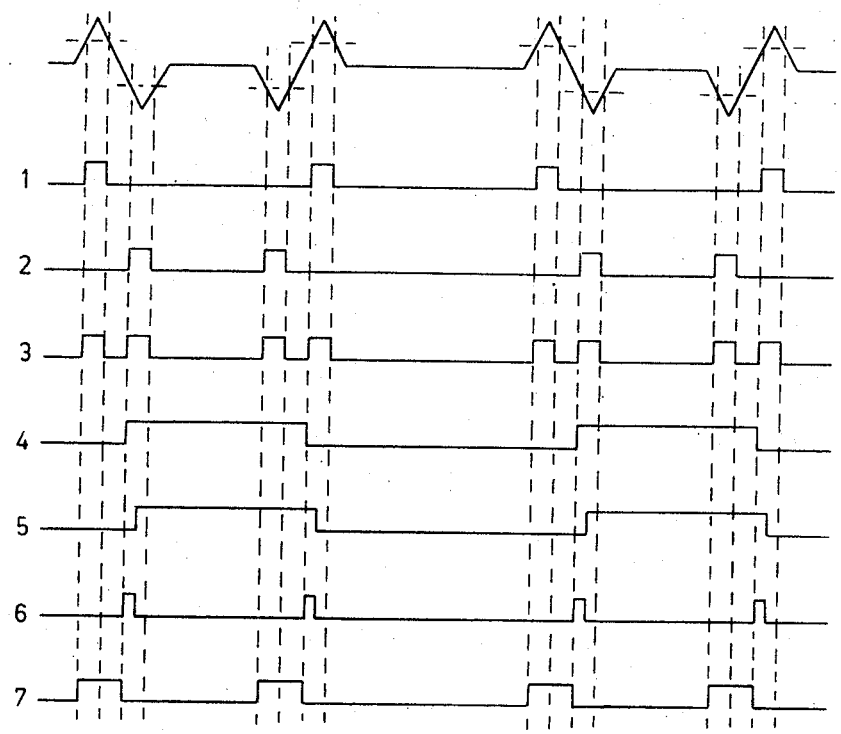
Figure 6:
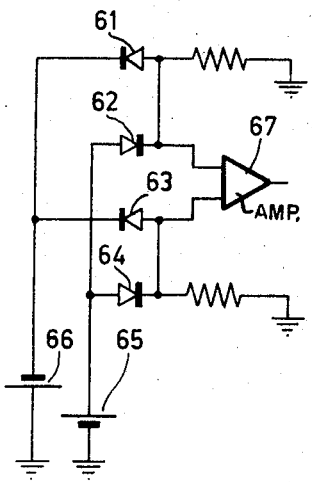
Figure 7:
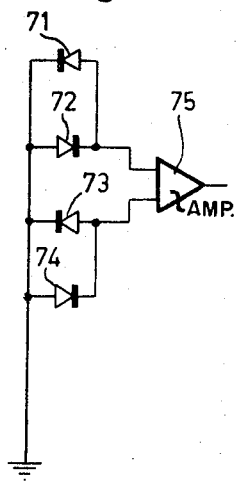
Figure 8:
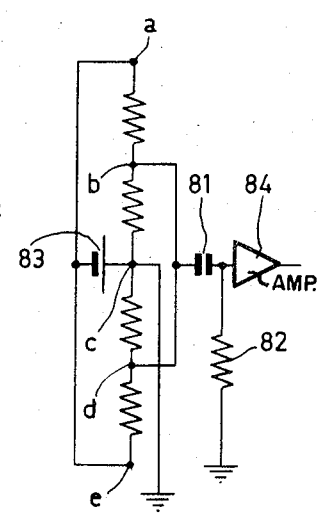

FIG. 2 represents the signal supplied by the detection system according to the invention, FIG. 3 shows the relationship between the signal supplied by the detection system and the reference signal, FIG. 4 is a block diagram of the circuit for processing the output signal of the detection system, FIG. 5 shows the signals developing at various points in this circuit, and FIGS. 6, 7 and 8 show different embodiments of a detection system according to the invention.

Figure 1A:
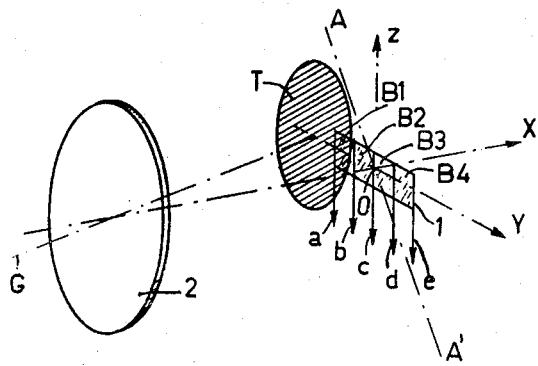
FIG. 1a is a perspective view of a detection system according to the invention.

The detector of FIG. 1a is formed by four radiation-sensitive areas $B_1$, $B_2$, $B_3$ and $B_4$ and five electrodes $a$, $b$, $c$, $d$, $e$. The four areas $B_1$, $B_2$, $B_3$ and $B_4$ are for example four bolometer layers. When such bolometer layers are heated by incident infrared radiation their resistance decreases. The detector 1 is located in the image focal plane of a lens 2. The direction $oy$ in which the areas $B_1$, $B_2$, $B_3$ and $B_4$ are arranged in line, is normal to the axis of rotation $AA'$ of the satelite, said axis being located in the plane $zoy$. The optical axis $ox$ of the lens 2 is normal to the plane $yoz$, in which the detector is located.

As the satellite rotates, the axis $ox$ generates a cone and if the distance from the line G, which is directed towards the centre of the earth, to said cone is smaller than the apparent radius of the earth, the image T of the earth passes the four radiation-sensitive areas $B_1$, $B_2$, $B_3$ and $B_4$ once per revolution.

Since the image travels in the direction $oy$, the layers $B_1$, $B_2$, $B_3$ and $B_4$ are irradiated in this order.

Figure 1B:
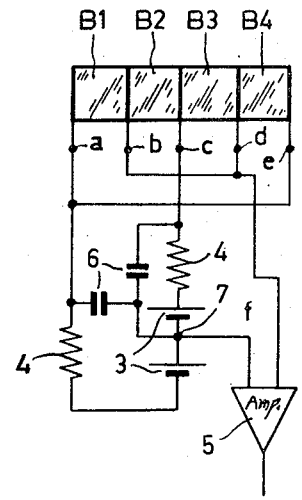
FIG. 1b is the circuit diagram of a device according to the invention.

FIG. 1b shows the electrical circuit associated with the detection elements $B_1$, $B_2$, $B_3$ and $B_4$. The supply voltage is derived from two identical generators 3, which have a centre tap 7. This centre tap is connected via $f$ to an amplifier 5. Each generator 3 is connected in series with a safety resistor 4 and a filter capacitance 6. The supply voltage is applied between the electrode $c$ and the electrodes $a$, $e$. The signal is derived from the electrodes $b$ and $d$ and compared with a reference signal derived from, for example, the electrode $c$.

When the image of the earth is not projected on any of the sensitive areas $B_1$, $B_2$, $B_3$, $B_4$ the electrical resistances of these detection elements $RB_1$, $RB_2$, $RB_3$, $RB_4$ are equal.

Assuming that the connection $b-d$ is open, the potential of point $b$ relative to point $c$ becones:

$$V_b = U \times RB_2/RB_1 + RB_2 = U/2.$$

Assuming that connection $b-d$ is open, the potential of point $d$ relative to point $c$ becomes:

$$V_d = U \times RB_3/RB_4 + RB_3 = U/2$$

Points $b$ and $d$ carry the same potential and the presence of the connection $b-d$ does not affect the value of Vb or Vd.

The following then applies: $V_{b,d} - V_c = U/2$.

When the image of the earth enters the area $B_1$ the resistance of the corresponding layer decreases to the value $R'B_1$, whereas the resistance of $B_2$ remains $RB_2$. Assuming that connection $b-d$ is open, the potential of point $b$ becomes:

$U \times RB_2/R'B_1 + RB_2$ which is greater than $U \times RB_2/RB_1 + RB_2$ $(R'B_1 < RB_1)$.

This potential may be expressed by $U/2 + dU$, in which $dU$ is the voltage change as a result of the resistance decrease of $B_1$.

By closing the connection $b-d$, the combination $B_1$, $B_2$, which may be considered as a generator which supplies a signal $U/2 + dU$ and which has an internal resistance $R'B_1 + RB_2$, is connected to a combination $B_3$, $B_4$, having an internal resistance $RB_3$, a voltage $U/2$ existing across $RB_4$. As $RB_1$ differs very little from $RB_2 = RB_3 = RB_4$, the signal between point $c$ and points $b$, $d$ becomes: $U/2 + dU/2$.

When the image of the earth enters the area $B_2$, the resistance of $B_2$ decreases to the value $R'B_2$; the values $R'B_1$, $RB_3$, $RB_4$ remain unchanged, Then: $R'B_1 = R'B_2$. Assuming that connection $b-d$ is open, the potential point $b$ is again $U/2$. This is not affected by the closure of the connection $b-d$, because the potential at point $d$ is also $U/2$. The signal between point $c$ and points $b,d$ then is $U/2$.

When the image of the earth enters the area $B_3$, the resistance of this element decreases to the value $R'B_3$. Then: $R'B_1 = R'B_2 = R'B_3 < RB_4$. Assuming that connection $b-d$ is open, the potential at point $d$ becomes:

$U \times R'B_3/R'B_3 + RB_4$ which is smaller than $U \times RB_3/RB_3 + RB_4$

This potential may be written $U/2 - dU$, in which dU represents the voltage change as a result of resistance reduction of $B_3$. When the connection $b-d$ is closed, the potential between point $c$ and points $b, d$ becomes $U/2 - dU/2$.

When the image of the earth advances and covers the area $B_4$, the resistance of this element becomes $R'B_4 = R'B_3 = R'B_2 = R'B_1$ and the signal between point $c$ and points $b,d$ again becomes $U/2$. The signal between point $c$ and points $b, d$ consecutively assumes the values: $U/2$, $U/2 + dU/2$, $U/2$, $U/2 - dU/2$, $U/2$. By shifting the level of this signal by $U/2$ the d.c. component $U/2$ can be removed, so that the signal values consecutively become as follows:

$$0, + dU/2, 0, - dU/2, 0.$$

Shifting by $U/2$ can be achieved by connecting an input of the amplifier 5, whose other input is connected to points $b$ and $d$, to point 7.

The amplitude of the effective portion of signal dU is divided by two as compared with its value if the connection $b$, $d$ were open, but the internal resistance across which this signal develops is also divided by two, so this does not result in a reduction of the signal-to-noise ratio.

FIG. 2 represents the potential difference V between points $b$, $d$ and point $c$ as a function of time when the image of the earth, which is assumed to be uniformly illuminated, travels over the detector. The signal differs from zero only when the front and rear edges of the image pass over the detector. When the time required by the horizon to pass each of the four elements is long relative to the time constant of the bolometer, the amplitude and shape of the signal remain the same; if the duration of this passage is of the same order as or shorter than the time constant, the signal is attenuated and delayed, which is shown by the dotted curve in FIG. 2.

In FIG. 3 the signal between point $c$ and points $b,d$ is represented by a solid line. Both the passage of the front and that of the rear edge of the image of the earth over the detector results in the occurrence of a positive pulse followed by a negative pulse, so that the signal passes through zero during each passage. The electrical reference threshold is also made zero, for irrespective of the deformation of the response as a result of changes in brightness, the position of the zero point, which is determined by the transition from area $B_2$ to area $B_3$ of the detector, is fixed. However, outside these pulses the detector response is also zero, except for the noise, which would lead to indeterminateness. In order to avoid this undeterminateness the reference threshold threshold has three levels: positive, zero and negative, as is indicated by the dashed line in FIG. 3. Switching between these levels is possible, so that the signal curve of the detector intersects the reference curve at no point outside the desired zero transition, Points A and B in FIG. 3 are the intersections between the signal curve and the reference curve in the case of passage of the front and read edge respectively of the image of the earth over the radiation-sensitive areas.

FIG. 4 shows the block diagram of a logic circuit for the sequential analysis of the signal supplied by the detector. Switching in this circuit is effected independently of time, i.e. of the rotation speed of the satellite.

The logic circuit comprises an amplifier 40, which receives the detector signal, two trigger circuits 41 and 42, a flip-flop circuit 43, a comparator 44, a logic "or" gate 45, a flip-flop circuit 46, a 2/4 combination logic element 47, whose truth table is as follows:

There is no signal 6 if the signals 4 and 5 are both "0" or both "1." A signal 6 is obtained if one of the signals 4 and 5 is "0" and the other is "1."

The logic circuit furthermore comprises a delay line 48 and a 1/3 combination logic element 49, whose truth table is as follows:

A signal is obtained at the connection 50 if the signal 7 is "1," independent of the signal 4.

A signal is obtained at the connection 51, if the signal 7 is "0," whilst the signal 4 is "1."

A signal is obtained at the connection 52, if the signal 7 is "0," whilst the signal 4 is "0."

The logic circuit operates as follows.

The signal derived from the detector is amplified by the amplifier 40 and is fed to two trigger circuits 41 and 42, which are positive and negative respectively, the trigger levels merely serving to enable the effective signal to be discriminated from the noise.

The output signals 1 and 2 of the two trigger circuits 41 and 42 respectively are applied to the set and reset inputs of a flip-flop circuit 43, which supplies an output signal 4 which serves for selecting the threshold, whose level differs from zero, of the comparator circuit 44.

The signals 1 and 2 are applied to an "or" gate 45, which supplies a signal 3.

The first pulse of the signal 3 serves to control a flip-flop circuit 46, which is reset by the second pulse of said signal 3. In order to avoid that the inverted cycle is supplied by the flip-flop circuit 46, which is controlled by its clock input, resetting is effected by simultaneously applying the second pulse of the signal 3 and a reset signal 6. The signal 6 is derived from the signal 4 and a signal 5 which is identical to 4, but which is delayed by means of a (2/4) logic combination 47 and the delay element 48. The flip-flop circuit 46 supplies a signal 7.

Selection of the levels of the thresholds which are applied to the comparator 44 is effected with the aid of a (1/3) logic circuit 49, the points 50, 51 and 52 of which are connected to a system of three analogous gates which supply the zero, the positive and the negative level respectively of the electrical reference threshold. The threshold value obtained at point 53 is applied to the input 54 of the comparator 44.

After amplification by amplifier 40 the signal from the detector is applied to the input 55 of the comparator 44, which in dependence upon the threshold applied to the input 54 produces pulses at its output 57 which correspond to a horizon passage.

FIG. 5 shows the signals developing at various points in the logic circuit.

FIG. 6 shows an alternative embodiment of a detection system according to the invention. The detection system consists of four photo-diodes 61, 62, 63 and 64, the photo-diodes 62 and 64 being connected to a supply source 65 and the photo-diodes 61 and 63 to a supply source 66. The signal is taken off between photo-diodes 62 and 63 and applied to the amplifier 67.

In the detection system according to FIG. 7 the radiation-sensitive elements are formed by four photo-cells 71, 72, 73 and 74. This obviates the use of a supply source. The signal is taken off between photo-cells 72 and 73 and is supplied to the differential amplifier 75.

The radiation-sensitive elements in the devices of FIGS. 6 and 7 consist of discrete components. The signals from the two first elements may be combined with those of the two last elements and may subsequently be applied to a differential amplifier (67 and 75).

FIG. 8 shows a device which is similar to that according to FIG. 1 but which includes an additional capacitor 81 and a bias resistor 82. As a result, the d.c. component which is caused by the bias voltage or slow signal variations due to a non-uniform illumination of the object under observation, are not applied to the amplifier 84.

What is claimed is:

1. A device for the detection of moving objects, comprising an optical imaging system, a radiation-sensitive detction system for converting radiation emerging from the imaging system into electric signals, and an electronic circuit for processing said signals, characterized in that the detection system comprises four separate radiation-sensitive detection elements which are arranged in line in the direction in which an image of an object travels, the output terminals of the detection elements being interconnected in such a way that the signal at the two output terminals of the complete detection system is the time derivative of the signal which would be produced if a single detector were used.

2. A device as claimed in claim 1, characterized in that the reference signal with which the output signal of the detection system is compared in the electronic circuit comprises a positive, a negative and a zero level.

3. A device as claimed in claim 1, characterized in that the four radiation-sensitive detection elements consist of bolometer elements, which are bounded by electrodes, a supply source being connected between the interconnected outer electrodes and the inner electrode, the interconnected, remaining electrodes being connected to an input of the electronic processing circuit.

4. A device as claimed in claim 1, characterized in that the four radiation-sensitive detection elements are photo-diodes, a first supply source being connected to the even-numbered photo-diodes and a second supply source to the odd-numbered photo-diodes, whilst the output terminals of the centre photo-diodes, which are each connected to the output terminals of the adjacent outer photo-diode, are coupled to the input terminals of the electronic processing circuit.

5. A device as claimed in claim 1, characterized in that the four-radiation-sensitive detection elements are photo-cells, the terminals of the centre photo-cells, which are each connected to the adjacent outer photo-cell, are coupled to the input terminals of the electronic processing circuit.

* * * * *